United States Patent

[11] 3,591,996

| [72] | Inventors | Victor Shanok;<br>Jesse P. Shanok, both of Brooklyn, N.Y. |
|---|---|---|
| [21] | Appl. No. | 637,378 |
| [22] | Filed | May 10, 1967 |
| [45] | Patented | July 13, 1971 |
| [73] | Assignee | Glass Laboratories Company<br>Brooklyn, N.Y. |

[54] MOLDING ATTACHMENT
1 Claim, 6 Drawing Figs.

[52] U.S. Cl. ............................................. 52/716
[51] Int. Cl. ............................................. E04f 11/02
[50] Field of Search ................................. 52/277,
506, 278, 716, 717; 85/DIG. 2; 264/263, 264, 273,
274; 24/73 HS

[56] References Cited
UNITED STATES PATENTS

| 3,222,838 | 12/1965 | Sweeney | 24/73 HS |
| 2,948,937 | 8/1960 | Rapata | 24/73 HS |
| 3,016,590 | 1/1962 | Shanok | 24/73 HS |
| 3,122,804 | 3/1964 | Stawinski | 24/73 HS |
| 3,188,730 | 6/1965 | Meyer | 24/73 HS |
| 2,268,768 | 1/1942 | Nathanson | 264/274 X |
| 2,366,274 | 1/1945 | Luth | 85/DIG. 2 |
| 3,127,965 | 4/1964 | Weisenberger | 52/718 |

*Primary Examiner*—John E. Murtagh
*Attorney*—Friedman & Goodman

ABSTRACT: This invention is concerned primarily with providing a novel method of attaching or blind fastening a strip of molding to a sheet of material, and the novel molding attachment produced thereby. Briefly, the method involves affixing the strip of molding to the sheet of material by means of a substance while in fluent form which will, when cooled, cured or set become a rigid composition. The liquid, or soft hardenable substance is forced through a bore or bores provided in a sheet of base material into a channel formed in the strip of molding, which molding channel confronts a surface of the base sheet, and when the substance is allowed to harden to a rigid consistency the molding and the sheet of material are anchored together thereby. The method is equally applicable for blind fastening of other articles.

PATENTED JUL 13 1971 3,591,996

INVENTORS
VICTOR SHANOK
BY JESSE P. SHANOK
Friedman & Goodman
ATTORNEYS 3,591,996

MOLDING ATTACHMENT

BACKGROUND OF THE INVENTION

1. Field of the Invention

This invention relates generally to a novel molding attachment. More particularly, the invention relates to means for attaching a strip of molding to a sheet of material.

2. Description of the Prior Art

The attachment of strips of molding to sheets of material has generally been accomplished in the past by fastening methods such as spot welding or by implements such as clips, rivets, bolts and the like.

For example, in affixing chrome molding to the doors and sides of automobiles, what is done is to bore a series of holes in a wall of the automobile in a horizontal fashion, then spring clips or the like are forced into said holes, and the chrome molding utilizing curved flanges provided therefor is attached to the ends of the spring clips. This procedure has proven unsatisfactory in many respects.

Similarly, the use of spot welds, rivets, bolts and the like, requires special equipment and is equally uneconomical and inefficient.

SUMMARY OF THE INVENTION

It is, therefore, among one of the principal objectives of this invention to provide a method for attaching a strip of molding or the other article to a sheet of material, such as for example the interior and exterior molding on an automobile, which will be rapid, efficient, durable and economical.

In accordance with the present invention a strip of decorative molding having a facing portion on one side thereof and a channel portion on the other, said channel portion comprising a front wall and a pair of opposite sidewall integrally formed therewith. Said channel portion is placed with each end of the opposing side wall smoothly abutting a surface of the sheet of material to which said strip is to be attached. A bore or bores are provided in the said sheet of material in a generally straight line relationship. As indicated, the ends of the opposing walls are placed in abutting smooth relation to said surface of the sheet, and, further, the opposing sidewalls are disposed such that the channel defined by said front wall and opposing sidewalls overlies the bore or bores. Thereafter, a liquid or molten substance, which when cooled, cured or set becomes a rigid composition, is forced through the bore, on the remote side thereof (with respect to the molding strip) filling the channel immediately surrounding the said bore, and said liquid substance being caused to overflow out of the bore onto the remote surface which is not abutted by the said ends of said sidewalls, with the result that an enlarged generally round "blob" of said substance completely covers the bore and overlies on said surface. When the hardenable substance is allowed to cool, cure or set, it becomes quite rigid and in effect forms a rivet-type fastening therefor, thereby anchoring the strip of molding to the sheet of material.

BRIEF DESCRIPTION OF THE DRAWING

The invention will be hereinafter more fully described with reference to the accompanying drawing, in which.

DESCRIPTION OF THE PREFERRED EMBODIMENTS

Figure 1:
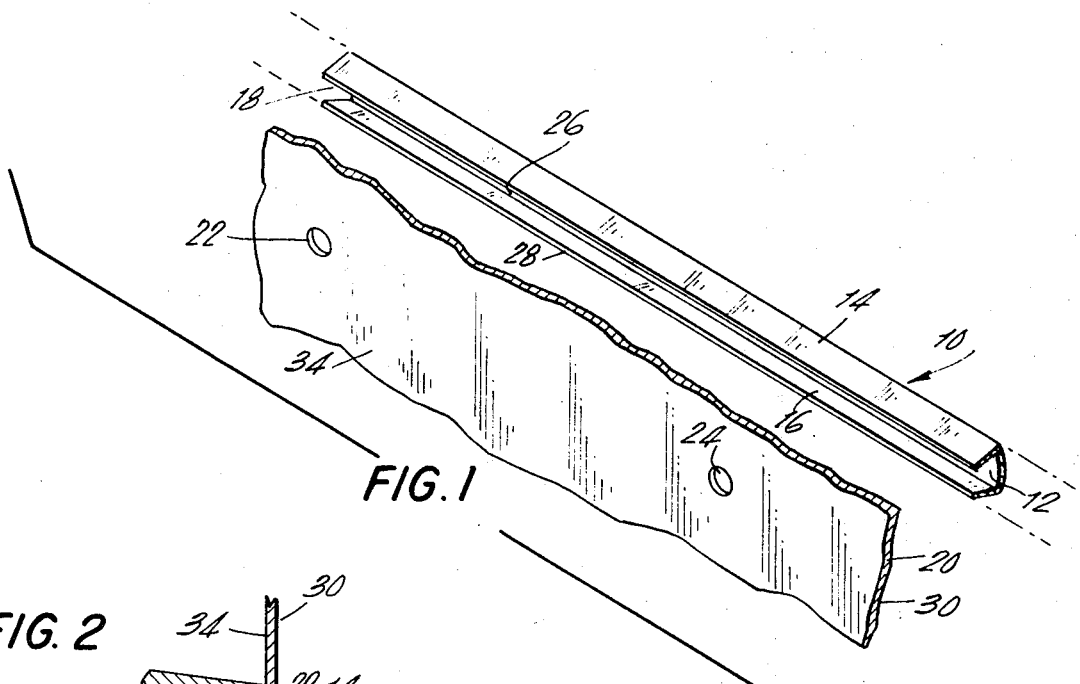
FIG. 1 is a view, in perspective, showing the molding strip and the sheet of support material to which it is to be attached, both shown in detached relationship and partly cut away.

Referring now to the figures of the drawing, the strip of molding generally referred to by the numeral 10 comprises a facing 11, a front channel wall 12 and a pair of opposing side channel walls 14 and 16 integrally formed therewith, said front wall and opposing sidewalls defining a channel designated generally by the numeral 18. Opposing sidewalls 14 and 16 are inwardly curved towards one another, such that an imaginary line drawn extending from said sidewalls would intersect at a point to the left of said molding 10 with respect to FIG. 2, for example. This channel may be characterized as a "dovetail" or "undercut" channel. A sheet of supporting material 20 to which the molding 10 is to be attached is provided with bores, as at 22 and 24 of FIG. 1, in a generally but not necessarily straight line relationship, one to the other.

Figures 2, 4:
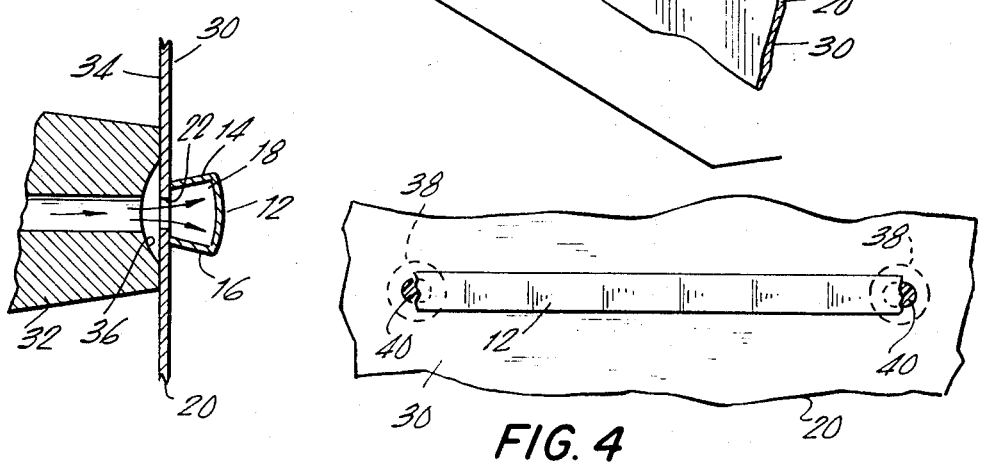
FIG. 2 is a side view in cross section, partly cut away, of the molding strip as it abuts a surface of the sheet, with the channel shown overlying a bore provided in said sheet, and the nosepiece of a suitable tool for forcing the hardenable substance into the bore being shown on the other side.
FIG. 4 is a front view of a strip of molding after it has been attached to a suitable sheet of material by the method of the invention, partly in cross section and partly cut away.
Figure 3:
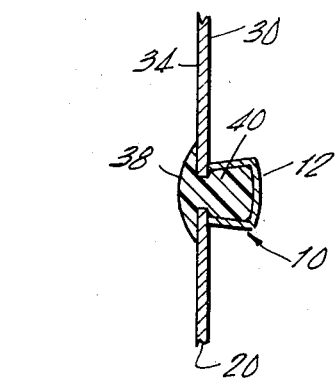
FIG. 3 is a side view in cross section, partly cut away, showing the strip of molding and the sheet of material in anchored relation by the already hardened substance.

In the method of the invention the flat ends 26 and 28 of side channel walls 14 and 16, respectively, are placed in smooth abutting relation to a surface 30 of the sheet of material 20, as in FIG. 2, so that the channel 18 overlies the bore 22 in said sheet 20. Thereafter a suitable dispensing tool 32, such as a gunlike mechanism or a squeezable tube, or a like dispenser, which contains the hardenable substance is placed in abutting relation to the other surface 34 of said sheet 20. The opening 36 of said dispensing tool is preferably concave in shape for the reason presently set forth, and said opening 36 also overlies bore 22 on the surface 34 side thereof. The molten or liquid hardenable substance, subsequently described hereinbelow, is forced through the bore 22 into channel 18, in the direction of the arrows, until the said channel is substantially filled immediately adjacent and surrounding the said bore 22, and thereafter the hardenable substance is allowed to fill concave opening 36 of the dispenser 32. Then the said dispenser is removed, leaving thereby a convex shaped head (i.e. a button head) 38 of hardenable substance in a generally circular concentric overlying relation with said bore 22. The fluent or molten substance is thereafter allowed to cure, set or form a rigid composition 40, thereby anchoring the molding 10 to the sheet of material 20, as in FIG. 3.

The molten or liquid substance may be any thermosetting material such as a plastic which when cured or dried becomes rigid. It may be an epoxy resin; it may also be a cement composition, the only limitation being that it become rigid on standing or being subjected to curing or setting conditions. Thermoplastic materials are suitable in many applications where the molding strip will not be subjected to softening temperatures in use. The fastening method is particularly advantageously employed for securing molding strips of thermoplastic material such as cellulose acetate butyrate.

The molding 10 as stated may be plastic, or chrome metal, or any metal for that matter. The sheet of material 20 may likewise be composed of the same, and any combination may be used, i.e. metal on plastic, or plastic on metal, or metal on metal, etc. The inventive method and molding attachment finds particular utility in the automobile industry for affixing chrome or metal encapsulated plastic molding strips inside and outside of automobiles. The method is particularly useful since the hardenable substance may be applied from the remote side, i.e. surface 34, leaving the molding in undisturbed, attractive appearance to the eye (FIG. 4).

Figure 5:
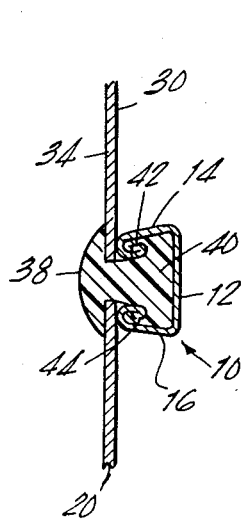
FIG. 5 is a side view in cross section, similar to FIG. 3, showing still another embodiment of the invention.

FIG. 5 shows another embodiment of the invention, in which the opposing sidewalls 14 and 16 are provided with flanges 42 and 44, respectively, which loop in upon themselves inside the said channel. As can be seen, when the rigidifying composition 40 is set to a rigid consistency, an even tighter anchoring effect will result between molding and sheet, since the composition 40 will be caught up behind the looped flanges 42 and 44. This is especially desirable if the fastening substance shrinks when it hardens to a rigid consistency, since it will pull molding 10 tightly up against surface 30. This shrinking will have the same tightening effect with the embodiment of FIG. 3, although not as pronounced as in FIG. 5. It is also desirable to use a fastening substance having adhesive characteristics.

It will also be noted that front wall 12 may be outwardly curved, with relation to support sheet 20 (Figs. 1—3), or be parallel thereto (FIG. 5), but this is not critical and depends on what the particular utility requires. Additionally, while dispensing tool 32 preferably has a concave opening 36, it may also have an opening flush with the surface 34, since all that need be done to form the convex head 38 is to draw the dispenser away slowly while allowing the molten material to continue flowing around the bore thereby forming a head or button therefor.

Figure 6:
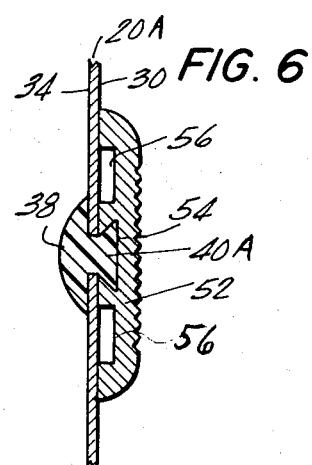
FIG. 6 is a view similar to FIGS. 3 and 5, showing a further embodiment of the invention.

FIG. 6 illustrates another form of the invention wherein a molding strip of greater width than the attachment channel is employed. This molding strip 20A is provided with a face wall 54 which may have an appropriate decorated surface and side extensions 56. The medial portion 54 of the strip is provided with an undercut or dovetail channel within which the hardenable substance is received which in rigid form forms a rivetlike attachment member 40A similar to the rigidified, rivetlike attachment members 40 of FIGS. 3 and 5 being an enlarged or button head 38. It will thus be seen that the invention may be advantageously applied to moldings of varying width and conformation by attaching same to suitable supporting surfaces without disturbing or distorting the decorative outer face of the molding in a simple, efficient and economical manner.

Having thus described the fundamental novel features of the invention as applied to specific embodiments, it is to be understood that various changes may be made in the invention by those skilled in the art without departing from the spirit and scope thereof.

We claim:

1. In combination, a strip of molding and a sheet of support material therefor, said molding being provided with a facing on one side thereof and a dovetail channel formed on the other side thereof, said channel being defined by sidewalls, said molding being in contacting relation with said sheet of support material, at least one bore being provided in said sheet of material, said channel overlying said bore, and a plastic composition disposed in said bore and channel adjacent thereto and overlying said bore on the surface of said sheet furtherest from said molding, securing said molding and said sheet of material in anchoring relation, wherein said ends of said sidewalls from flanges integral therewith, said flanges looping inwardly upon themselves.